Aug. 11, 1953
L. R. PHILLIPS ET AL
APPARATUS FOR MEASURING VELOCITY AND
TEMPERATURE OF FLUIDS
Filed Feb. 10, 1949
2,648,224
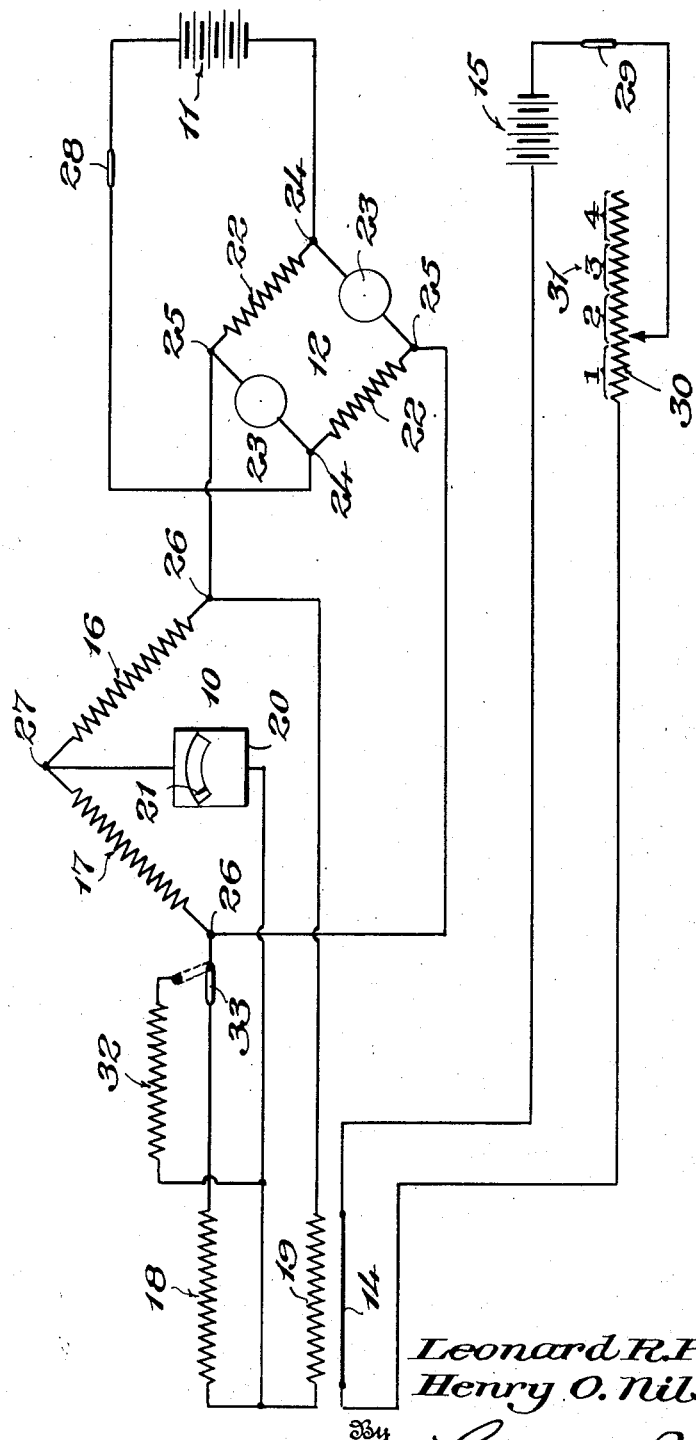
Inventors
Leonard R. Phillips,
Henry O. Nilsson,
By
Carroll Bailey
Attorney

UNITED STATES PATENT OFFICE 2,648,224

APPARATUS FOR MEASURING VELOCITY AND TEMPERATURE OF FLUIDS

Leonard R. Phillips, Teaneck, N. J., and Henry O. Nilsson, Centerport, N. Y., assignors to Anemostat Corporation of America, New York, N. Y., a corporation of Delaware Application February 10, 1949, Serial No. 75,604

2 Claims. (Cl. 73—204)

This invention relates to electrical apparatus for measuring certain conditions, such as the velocity and the temperature, of fluids such as air, and has particular reference to improvements in such apparatus which function to accomplish their purposes by indicating the change in the electrical resistance of an element resulting from a change in its temperature brought about by exposing the same to a fluid the velocity or the temperature of which is to be measured.

Certain of the more important objects of the invention are: to provide a measuring apparatus of the character referred to which is of simple, practical design and which is reliable and accurate in measuring very low fluid velocities of only a few feet per minute as well as very high fluid velocities of hundreds of feet per minute; which is equally reliable and accurate in measuring fluid temperatures in fractions of degrees; and which is easy to use and affords instantaneous, direct measurements without any necessity of timing, calculation or reference to tables or graphs.

With the foregoing and other objects in view, which will become more fully apparent as the nature of the invention is better understood, the same consists in an electrical measuring apparatus of the character referred to embodying the novel combination and arrangement of elements as illustrated by way of example in the accompanying drawings and as will be hereinafter more fully described and claimed.

In the accompanying drawing, the figure is a diagrammatic view of an electrical measuring apparatus constructed in accordance with the invention.

Referring to the drawing in detail, it will be observed that the present apparatus comprises, primarily and for velocity measuring purposes, a Wheatstone bridge, designated generally as 10, a source of current, such as a battery 11, for energizing said bridge, a regulating device, designated generally as 12, interposed between said source of current and said bridge to compensate for any changes in voltage of the battery 11 so as to maintain a constant impressed voltage on said bridge, and means including an electrical heating element 14 and a source of current such as a battery 15, for heating one of the arms of said bridge 10.

The bridge 10 comprises, as usual, four arms 16, 17, 18 and 19 and a suitable current flow indicating instrument 20 which is connected across said arms and which includes, as usual, an indicating element 21.

Two of the arms of the bridge 10, the arms 16 and 17 for example, are composed of windings of a suitable material, such as manganin, which possesses the characteristic that it has a substantially zero coefficient of resistance. The other two arms of said bridge, the arms 18 and 19 for example, are composed of a material, such as nickel, which possesses the characteristic that it has a substantially uniform positive temperature coefficient of resistance.

The regulating device 12 may be of any suitable type and is illustrated by way of example as comprising a pair of resistance windings 22, 22 and a pair of tungsten filament lamps 23, 23 which are alternated with respect to said windings and connected to the latter in a bridge circuit. The battery 11 is connected to the input terminals 24, 24 of said regulator and the output terminals 25, 25 of said regulator are connected to the input terminals 26, 26 of the bridge 10, whereby said regulator performs its stated purpose.

The two arms 16 and 17 and the indicating instrument 20 of the bridge 10, as well as the batteries 11 and 15 and the regulating device 12, may be contained in a suitable case. On the other hand, the two arms 18 and 19 of the bridge 10 and the heating element 14 are embodied in a small probe device having flexible connections with said case-contained elements for convenient exposure of said arms 18 and 19 to air or other fluid the velocity or the temperature of which is to be measured. The heating element 14 is associated with one of the bridge arms that is included in the probe device, for example with the bridge arm 19 of said probe device.

During manufacture of the apparatus and while the two arms 18 and 19 of the bridge 10 are of the same temperature, said bridge is very carefully balanced. This may be done, for example, by carefully locating the connection 27 of the instrument 20 between the bridge arms 16 and 17. This connection then is soldered or is otherwise made permanent so that the balance does not change, but remains fixed.

To use the apparatus for measuring the velocity of a fluid, the bridge circuit is closed by a suitable switch 28. The circuit including the heating element 14 then is closed by a suitable switch 29, with the result that said heating element 14 is heated and thereby heats the arm 19 of the bridge 10. The resistance of said arm 19 thereby is increased and, as a result, the bridge 10 is unbalanced. Then, while the two arms 18 and 19 of the bridge 10 are subjected to a condition of zero air flow, the flow of current from the battery 15 to the heating element 14 is regulated, as through a variable resistance 30, to cause predetermined deflection of the indicating element 21.

The bridge arms 18 and 19 then are exposed to the fluid the velocity of which is to be measured. The fluid flowing over the heated arm 19 will effect cooling of said arm with consequent decrease in its electrical resistance proportionately to the velocity of the fluid. With decrease in the electrical resistance of the arm 19, the bridge 10 will tend to assume its balanced condition and this will be reflected in return movement of the indicating element 21 from its deflected position. The deflected position of said indicating element 21 corresponds to zero velocity of the fluid being measured. Hence, the amount of movement of said indicator element 21 from its deflected position is a measure of the velocity of the fluid. The instrument 20 is, of course, suitably calibrated to indicate the velocity.

If only the bridge arm 19 should be exposed to the fluid the velocity of which is being measured, different temperatures of the fluid to which the bridge arm 19 might be exposed, might disturb the balance of the bridge. Since, however, the bridge arm 18 also is exposed to the fluid, it acts as a compensator for differing temperature of the fluid and thereby prevents unbalancing of the bridge, which is an important feature of the invention.

Obviously, by varying the degree of heating of the bridge arm 19, the apparatus may be used for measuring various different ranges of fluid velocities. In this connection, the variable resistance 30 may have fluid range designations as indicated at 31.

To adapt the apparatus for measuring the temperature of a fluid, there is included in the apparatus a zero temperature coefficient resistance element 32 and a suitable switch 33 whereby this resistance element may be substituted for one of the arms 18 or 19 of the bridge 10, for example, for the arm 18 of said bridge. In this connection, during manufacture of the instrument and while the resistance element 32 is substituted for the bridge arm 18, the instrument is adjusted so that the indicating element 21 will assume some definite position when the arm 19 of the bridge is at some given basic temperature. Thus adjustment thereafter is not disturbed. Hence, when it is desired to take a temperature measurement, all that is necessary is to substitute the resistance element 32 for the bridge arm 18 and, without heating the bridge arm 19, to expose said arm 19 to the fluid the temperature of which is to be determined. The change in temperature and, hence, in the resistance of the arm 19 effected by the fluid will disturb the bridge 10 and result in deflection of the indicating element 21. The amount of deflection of said indicating element from its definite position corresponding to the aforesaid given basic temperature will then be a measure of the difference between said basic temperature and the temperature of the fluid. The instrument 20 may, of course, be provided with a scale, calibrated in terms of temperature, with which the element 21 may cooperate to indicate temperatures.

From the foregoing description considered in connection with the accompanying drawing it is believed that the construction and operation of the present measuring apparatus will be clearly understood and its advantages appreciated. It is desired to point out, however, that while only a single specific embodiment of said apparatus has been illustrated and described, the same is readily capable of specifically different embodiments within the spirit and scope of the invention as defined in the appended claims.

We claim:

1. An instrument for measuring velocity of flow of a fluid, said instrument comprising a Wheatstone bridge having two arms with zero temperature coefficients of resistance and two other arms with positive temperature coefficients of resistance for simultaneous exposure to a fluid the flow of which is to be measured, a source of current connected to said bridge for energizing the same, said arms being non-adjustably connected together and having resistance values such that the bridge is balanced whenever said two exposed arms are of the same temperature, a bridge unbalance indicating instrument having at one side thereof a permanent non-adjustable connection with said bridge at a point between two of the arms thereof and at the other side thereof having a permanent non-adjustable connection with said bridge at a point between the other two arms thereof; said points being located so that there is no flow of current through the unbalance indicating instrument when the two exposed arms are of the same temperature, and means in heat exchange relationship to one of said exposed arms for artificially heating the same, whereby the cooling effect upon said exposed arms of fluid flowing past the same causes said unbalance indicating instrument to indicate the velocity of the fluid.

2. A combined instrument for selectively measuring the velocity of flow and the temperature of a fluid, said instrument comprising a Wheatstone bridge having two arms with zero temperature coefficients of resistance and two other arms with positive temperature coefficients of resistance for simultaneous exposure to a fluid the flow of which is to be measured, a source of current connected to said bridge for energizing the same, said arms being non-adjustably connected together and having resistance values such that the bridge is balanced whenever said two exposed arms are of the same temperature, a bridge unbalance indicating instrument having at one side thereof a permanent non-adjustable connection with said bridge at a point between two of the arms thereof and at the other side thereof having a permanent non-adjustable connection with said bridge at a point between the other two arms thereof; said points being located so that there is no flow of current through the unbalance indicating instrument when the two exposed arms are of the same temperature, means in heat exchange relationship to one of said exposed arms for artificially heating the same, whereby the cooling effect upon said exposed arms of fluid flowing past the same causes said unbalance indicating instrument to indicate the velocity of the fluid, a zero temperature coefficient resistance element separate from the zero temperature coefficient arms of said bridge, and switching means interposed between one of the positive temperature coefficient arms and one of the zero temperature coefficient arms of said bridge and effective to connect said separate zero temperature coefficient resistance element in said bridge in lieu of one of said positive temperature coefficient arms, thus to adapt said instrument to indicate temperature when said heating means is inactive and when the bridge is unbalanced due to the effect of temperature on the resistance of the exposed positive temperature coefficient arms of said bridge.

LEONARD R. PHILLIPS.
HENRY O. NILSSON.

References Cited in the file of this patent

UNITED STATES PATENTS

| Number | Name | Date |
| --- | --- | --- |
| 1,094,733 | Lyle | Apr. 28, 1914 |
| 1,691,600 | Brush | Nov. 13, 1928 |
| 1,724,296 | MacGregor-Morris | Aug. 13, 1929 |
| 2,016,660 | Weeks | Oct. 8, 1935 |
| 2,256,395 | Laub | Sept. 16, 1941 |
| 2,377,884 | Hillman | June 12, 1945 |
| 2,389,615 | Eder | Nov. 27, 1945 |
| 2,412,471 | Olson | Dec. 10, 1946 |

FOREIGN PATENTS

| Number | Country | Date |
| --- | --- | --- |
| 117,920 | Great Britain | Aug. 15, 1918 |